(12) United States Patent
Haslinger et al.

(10) Patent No.: US 11,973,551 B2
(45) Date of Patent: Apr. 30, 2024

(54) COMMUNICATION DEVICE AND OPERATING METHOD

(71) Applicant: NXP B.V., Eindhoven (NL)

(72) Inventors: Dorian Haslinger, Nestelbach bei Graz (AT); Wolfgang Eber, Graz (AT); David Veit, Graz (AT)

(73) Assignee: NXP B.V., Eindhoven (NL)

( * ) Notice: Subject to any disclaimer, the term of this patent is extended or adjusted under 35 U.S.C. 154(b) by 94 days.

(21) Appl. No.: 17/658,945

(22) Filed: Apr. 12, 2022

(65) Prior Publication Data

US 2022/0345184 A1  Oct. 27, 2022

(30) Foreign Application Priority Data

Apr. 23, 2021 (EP) .................................. 21170315

(51) Int. Cl.
*H04B 7/06* (2006.01)
*H04W 4/02* (2018.01)
(52) U.S. Cl.
CPC .......... *H04B 7/0608* (2013.01); *H04W 4/023* (2013.01)
(58) Field of Classification Search
CPC .. H04B 7/0608; H04B 7/0805; H04B 7/0404; H04W 4/023; G01S 13/765
See application file for complete search history.

(56) References Cited

U.S. PATENT DOCUMENTS

| | | | |
|---|---|---|---|
| 5,561,673 A | 10/1996 | Takai et al. | |
| 6,327,481 B1 | 12/2001 | Nagashima | |
| 7,366,139 B2 | 4/2008 | Poegel et al. | |
| 8,531,337 B2 | 9/2013 | Castany et al. | |
| 9,961,600 B2 | 5/2018 | Gopal et al. | |
| 10,033,114 B2 | 7/2018 | Pros et al. | |
| 10,440,650 B2 | 10/2019 | Clevorn | |
| 11,400,889 B2* | 8/2022 | Parthasarathi | ......... H01Q 1/243 |
| 2009/0323872 A1 | 12/2009 | Haller | |
| 2012/0087431 A1 | 4/2012 | Liu et al. | |
| 2012/0219036 A1* | 8/2012 | Teague | ................. H04B 7/0874 455/66.1 |
| 2013/0051258 A1 | 2/2013 | Huang et al. | |
| 2014/0273866 A1 | 9/2014 | Swaminathan et al. | |
| 2018/0234797 A1 | 8/2018 | Ledvina et al. | |

(Continued)

FOREIGN PATENT DOCUMENTS

| | | | |
|---|---|---|---|
| KR | 19990009325 A | 2/1999 | |
| KR | 100270227 B1 | 10/2000 | |

*Primary Examiner* — Dac V Ha (57) ABSTRACT

In accordance with a first aspect of the present disclosure, a communication device is provided, comprising: a plurality of antennas; a communication unit configured to execute ranging sessions with an external communication counterpart through said antennas; an antenna selection unit configured to select a specific antenna from said plurality antennas for carrying out one or more of said ranging sessions, wherein the antenna selection unit is configured to select said specific antenna in dependence on one or more parameters indicative of a communication quality between the antennas and the external communication counterpart. In accordance with a second aspect of the present disclosure, a corresponding method of operating a communication device is conceived. In accordance with a third aspect of the present disclosure, a computer program is provided for carrying out said method.

21 Claims, 7 Drawing Sheets

(56) References Cited

U.S. PATENT DOCUMENTS

2020/0118372 A1    4/2020  Stitt et al.
2022/0099790 A1*   3/2022  Lim ..................... G01S 13/765
2022/0393758 A1*  12/2022  Besoli ................. H04B 7/0695

* cited by examiner

COMMUNICATION DEVICE AND OPERATING METHOD

CROSS-REFERENCE TO RELATED APPLICATIONS

This application claims the priority under 35 U.S.C. § 119 of European Patent application no. 21170315.2, filed on 23 Apr. 2021, the contents of which are incorporated by reference herein.

TECHNICAL FIELD

The present disclosure relates to a communication device. Furthermore, the present disclosure relates to a corresponding method of operating a communication device, and to a corresponding computer program.

BACKGROUND

Real-time localization systems typically include a plurality of so-called anchors, which are placed at fixed positions in the environment (e.g., a vehicle, a building or a room), and a plurality of mobile nodes, which are often referred to as tags. Using radio technology, a tag can determine its position relative to the available anchors. In many applications the tag's orientation relative to the environment and anchors is arbitrary and cannot be controlled. For applications in which tags are carried by human beings, the influence of the human body on the wave propagation between tags and anchors is significant. Nevertheless, these applications demand that the ranging and localization works independently of the position (e.g., front pocket, back pocket or handbag) and orientation (i.e., rotation in space) of the tags. In real environments these systems should cope with multipath propagation and antenna detuning, which can cause a significant variance in the distance estimates.

SUMMARY

In accordance with a first aspect of the present disclosure, a communication device is provided, comprising: a plurality of antennas; a communication unit configured to execute ranging sessions with an external communication counterpart through said antennas; an antenna selection unit configured to select a specific antenna from said plurality antennas for carrying out one or more of said ranging sessions, wherein the antenna selection unit is configured to select said specific antenna in dependence on one or more parameters indicative of a communication quality between the antennas and the external communication counterpart.

In one or more embodiments, said parameters include a previously measured distance between the communication device and the external communication counterpart.

In one or more embodiments, the antenna selection unit is configured to select the specific antenna that resulted in a smallest previously measured distance among the plurality of antennas or the specific antenna that resulted in a largest previously measured distance among the plurality of antennas.

In one or more embodiments, said parameters include a first path power level.

In one or more embodiments, the antenna selection unit is configured to select the specific antenna that resulted in a lowest first path power level among the plurality of antennas or the specific antenna that resulted in a highest first path power level among the plurality of antennas.

In one or more embodiments, said parameters include a ratio between a first path power level and a received power level.

In one or more embodiments, the antenna selection unit is configured to select the specific antenna that resulted in a lowest ratio between the first path power level and the received power level among the plurality of antennas or to select the specific antenna that resulted in a highest ratio between the first path power level and the received power level among the plurality of antennas.

In one or more embodiments, the antenna selection unit is further configured to switch to a next antenna of said plurality of antennas if a difference between two or more consecutive distance measurements performed on a current antenna exceeds a predefined first threshold.

In one or more embodiments, the antenna selection unit is further configured to switch to a next antenna of said plurality of antennas if a difference between first path power levels associated with two or more consecutive distance measurements exceeds a predefined second threshold.

In one or more embodiments, the antenna selection unit is further configured to switch to a next antenna of said plurality of antennas after a predefined number of ranging sessions has been performed on a current antenna.

In one or more embodiments, the communication device further comprises a processing unit configured to calculate an arithmetic mean value of the results of ranging sessions performed on different antennas of said plurality of antennas.

In one or more embodiments, the antenna selection unit is a reconfigurable antenna selection unit.

In one or more embodiments, the communication unit is an ultra-wideband (UWB) communication unit.

In accordance with a second aspect of the present disclosure, a method of operating a communication device is conceived, the device comprising a plurality of antennas, a communication unit and an antenna selection unit, the method comprising: selecting, by the antenna selection unit, a specific antenna from said plurality antennas for carrying out one or more ranging sessions, wherein the antenna selection unit selects said specific antenna in dependence on one or more parameters indicative of a communication quality between the antennas and an external communication counterpart; executing, by the communication unit, said ranging sessions with the external communication counterpart with the selected specific antenna.

In accordance with a third aspect of the present disclosure, a computer program is provided, comprising executable instructions which, when executed by a communication device, cause said communication device to carry out a method of the kind set forth.

DESCRIPTION OF DRAWINGS

Embodiments will be described in more detail with reference to the appended drawings, in which.

DESCRIPTION OF EMBODIMENTS

As mentioned above, real-time localization systems typically include a plurality of so-called anchors, which are placed at fixed positions in the environment (e.g., a vehicle, a building or a room), and a plurality of mobile nodes, which are often referred to as tags. Using radio technology, a tag can determine its position relative to the available anchors. In many applications the tag's orientation relative to the environment and anchors is arbitrary and cannot be controlled. For applications in which tags are carried by human beings, the influence of the human body on the wave propagation between tags and anchors is significant. Nevertheless, these applications demand that the ranging and localization works independently of the position (e.g., front pocket, back pocket or handbag) and orientation (i.e., rotation in space) of the tags. In real environments these systems should cope with multipath propagation and antenna detuning, which can cause a significant variance in the distance estimates.

This effect can be mitigated by using multiple antennas on the anchors and/or tags. As the size restrictions for mobile tags are more strict, solutions using antenna diversity on the anchors only are preferred. Still, multiple antennas can be implemented in the tags as well. One way to use the available antennas is to perform distance measurements over all the antennas at every ranging interval. However, this approach results in a high-power consumption and airtime. Longer airtime increases the interference to other systems. A better strategy would be to use only the antenna that yields the most accurate distance estimate. However, it may be difficult to select the most suitable antenna among a plurality of antennas. It is noted that for regular communication systems usually the antenna resulting in the highest received power is used. However, the goal of antenna diversity for ranging and localization is not to choose the antenna that results in the highest signal-to-noise ratio, but the antenna delivering the most accurate ranging result. Therefore, applying strategies known from communication systems to ranging systems might result in a poor performance.

It is noted that ranging or localization operations may be performed by means of different radio technologies. A technology which is often used for this purpose is ultra-wideband (UWB) technology. UWB is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, potentially capable of supporting high data rates. UWB technology enables a high data throughput for communication devices and a high precision for the localization of devices. In particular, UWB technology may be used for so-called ranging operations, i.e., for determining the distance between communicating devices. More specifically, these ranging operations may be time-of-flight ranging sessions which are executed as UWB ranging sessions. Alternatively, time-of-flight ranging sessions may be executed as a Bluetooth High Accuracy Distance Measurement (HADM), which will be introduced in Bluetooth 6.0, a light or laser based two-way ranging session, or a 77 GHz frequency-modulated continuous-wave (FMCW) radar based two-way ranging session. Accordingly, these technologies are alternatives to UWB and can also be used for ranging and localization.

Now discussed are a communication device and a corresponding method of operating a communication device, which facilitate selecting a suitable antenna for performing ranging and localization, when a plurality of antennas is available in the communication device.

Figure 1:
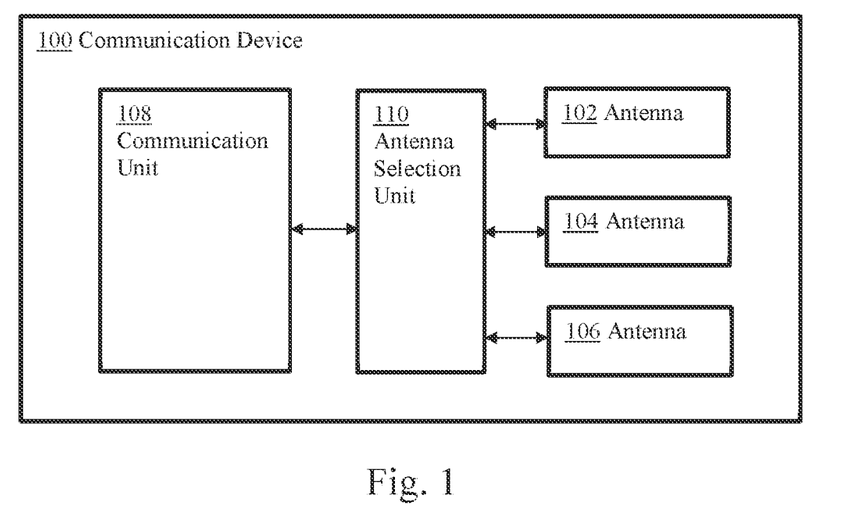
FIG. 1 shows an illustrative embodiment of a communication device.

FIG. 1 shows an illustrative embodiment of a communication device 100. The communication device 100 includes a plurality of antennas 102, 104, 106, a communication unit 108 and an antenna selection unit 110. The communication unit 108 is configured to execute ranging sessions with an external communication counterpart (not shown) through said antennas 102, 104, 106. Furthermore, the antenna selection unit 110 is configured to select a specific antenna from said plurality antennas 102, 104, 106 for carrying out one or more of said ranging sessions. More specifically, the antenna selection unit 110 is configured to select said specific antenna in dependence one or more parameters indicative of a communication quality between the antennas 102, 104, 106 and the external communication counterpart. In this way, the selection of a suitable antenna for performing the ranging sessions is facilitated. More specifically, the likelihood that the most suitable antenna is selected may be increased. It is noted that each ranging session comprises one or more measurements which are based on messages exchanged between the communication node and the external communication counterpart. By taking into account at least one previously measurement, including for example a distance estimate and other channel-specific parameters, the likelihood that the most suitable antenna is selected for next distance measurements may be increased.

In the following UWB is described as an example. However, as mentioned above, other technologies may also be used for executing the ranging sessions. In particular, UWB technology may be used to measure the distance between a UWB communication node (for example, a mobile device that functions as a key for accessing a vehicle or opening a door) and various external UWB communication nodes (for example, a vehicle and a door). Typically, distance measurements are performed during UWB communication sessions referred to as a ranging session. A typical UWB-based ranging session includes one or more messages (i.e., frames that are part of a distance estimation sequence) transmitted from a UWB communication node (which may also be referred to as a "reader") to one or more external UWB communication nodes (i.e., communication nodes which are external to the communication node), as well as one or more messages in response to those frames, which are transmitted back to the communication node by the external communication nodes. Thus, each ranging session may comprise one or more distance measurements based on messages exchanged between the communication node and said external communication nodes.

In one or more embodiments, the parameters include a previously measured distance between the communication device and the external communication counterpart. In this way, the selection of a suitable antenna for performing the ranging sessions is further facilitated. In particular, the likelihood that the most suitable antenna is selected may be further increased. The previously measured distance provides a particularly suitable indication of the channel quality between each of the respective antennas and the external communication counterpart. In one or more embodiments, the antenna selection unit is configured to select the specific antenna that resulted in a smallest previously measured distance among the plurality of antennas or the specific antenna that resulted in a largest previously measured distance among the plurality of antennas. In this way, the likelihood that the most suitable antenna is selected for next distance measurements may be further increased. In particular, for some applications, the antenna resulting in the lowest previous distance estimate may be the most suitable antenna, and for other applications, the antenna resulting in the highest previous distance estimate may be the most suitable antenna. More specifically, depending on the properties of the environment and/or the wireless channel either the shorter or longer distance estimate may be used. In many cases, selecting the antenna that resulted in the lowest previous distance estimate yields a high performance for subsequent measurements.

In one or more embodiments, the parameters include a first path power level. In this way, the selection of a suitable antenna for performing the ranging sessions is further facilitated. In particular, the likelihood that the most suitable antenna is selected may be further increased. It is noted that the estimated channel impulse response consists of multiple taps (or bins, or samples) relating to the power received by the receiving device at a given time. Before the transmitted signal arrives at the receiving node, the receiver only captures noise. The first path refers to the first tap in the estimated channel impulse response that contains sufficient energy of the transmitted signal for the receiver to distinguish it from noise. Whether the first sample (for example, an edge) or the first peak following this sample (for example, a local maximum) is used depends on the implementation. The first path power level may be defined as the power value of this first path.

In one or more embodiments, the antenna selection unit is configured to select the specific antenna that resulted in a lowest first path power level among the plurality of antennas or the specific antenna that resulted in a highest first path power level among the plurality of antennas. In this way, the likelihood that the most suitable antenna is selected for next distance measurements may be further increased. In particular, for some applications, the antenna resulting in the lowest first path power may be the most suitable antenna, and for other applications, the antenna resulting in the highest first path power may be the most suitable antenna. It is noted that the use of the lowest first path power may result in a better performance on average. Still under some environmental conditions the use of the highest first path power may yield a higher performance. Again, the deciding factor may be the environment, which is mostly determined by the application. However, different environments may occur for the same application, e.g. a car on an empty parking lot versus a car on a full parking lot or garage.

In one or more embodiments, the parameters include a ratio between a first path power level and a received power level. In this way, the selection of a suitable antenna for performing the ranging sessions is further facilitated. In particular, the likelihood that the most suitable antenna is selected may be further increased. In particular, the ratio between the first path power level and the received power level is important as it provides information on the power distribution over the channel impulse response, which might be used to distinguish between different environmental scenarios or provide a quality indication for some scenarios. The higher the first path power to received power ratio is, the less energy is contained in multipaths following the first path (in taps after the first path of the channel impulse response). It is noted that the received power may be calculated from the estimated channel impulse response by summing the power values of the estimated channel impulse response in a given window centered at the highest peak of the estimated channel impulse response. In general, this window is chosen to exclude most of the noise and include the most significant contributions of the multipath channel. But for other devices this value may be generated by a power level measurement in the receiver (RX) path or by using the settings of an automatic gain control unit, which usually uses power level measurements in the RX path.

In one or more embodiments, the antenna selection unit is configured to select the specific antenna that resulted in a lowest ratio between the first path power level and the received power level among the plurality of antennas or to select the specific antenna that resulted in a highest ratio between the first path power level and the received power level among the plurality of antennas. In particular, for some applications, the antenna resulting in the lowest first path power to received power ratio may be the most suitable antenna, and for other applications, the antenna resulting in the highest first path power to received power ratio may be the most suitable antenna. It is noted that in most scenarios the use of a lower first path power to received power ratio results in a higher performance. However, in some scenarios, the use of a higher ratio may yield a better performance.

In one or more embodiments, the antenna selection unit is further configured to switch to a next antenna of said plurality of antennas if a difference between two or more consecutive distance measurements performed on a current antenna exceeds a predefined first threshold. In this way, the selection of a suitable antenna for performing the ranging sessions is further facilitated. In particular, if said difference exceeds the first threshold, then the current antenna may not result in sufficiently stable distance measurements. In one or more embodiments, the antenna selection unit is further configured to switch to a next antenna of said plurality of antennas if a difference between first path power levels associated with two or more consecutive distance measurements exceeds a predefined second threshold. In this way, the selection of a suitable antenna for performing the ranging sessions is further facilitated. In particular, if said difference exceeds the second threshold, then the current antenna may not result in sufficiently stable distance measurements.

In one or more embodiments, the antenna selection unit is further configured to switch to a next antenna of said plurality of antennas after a predefined number of ranging sessions has been performed on a current antenna. In this way, the likelihood that reliable distance measurements are provided may be increased, because each antenna will be used an equal number of times to perform the ranging sessions. In one or more embodiments, the communication device further comprises a processing unit configured to calculate an arithmetic mean value of the results of ranging sessions performed on different antennas of said plurality of antennas. In this way, the likelihood that an accurate distance estimate is provided may be increased. Furthermore, in one or more embodiments, the antenna selection unit is a reconfigurable antenna selection unit. In this way, the communication device may easily be reconfigured for various applications. For instance, a programmable parameter may define whether the antenna selection unit should select the antenna resulting in the lowest previous distance estimate or the antenna resulting in the highest previous distance estimate.

Figure 2:
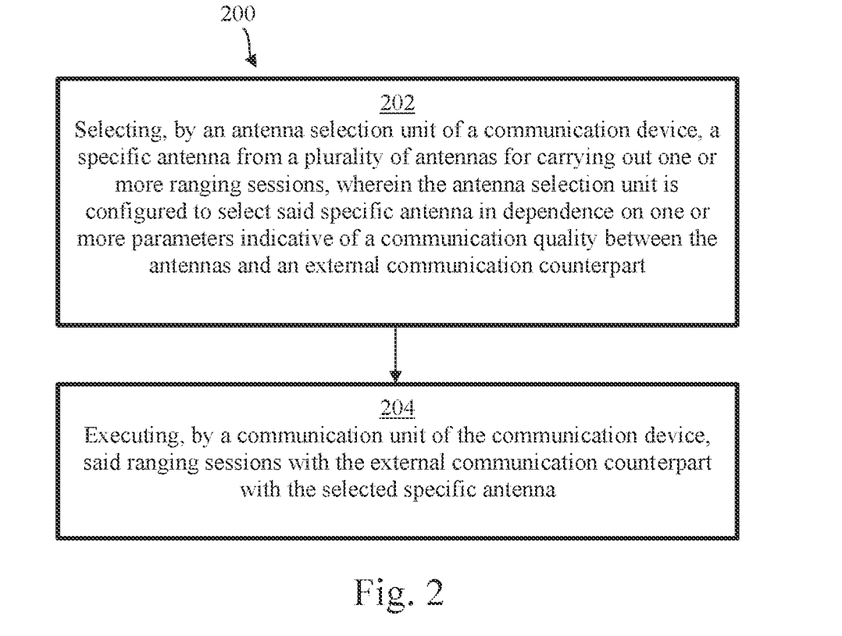
FIG. 2 shows an illustrative embodiment of a method of operating a communication device.

FIG. 2 shows an illustrative embodiment of a method 200 of operating a communication device. The method comprises the following steps. At 202, an antenna selection unit of a communication device selects a specific antenna from a plurality of antennas for carrying out one or more ranging sessions, wherein the antenna selection unit selects said specific antenna in dependence on one or more parameters indicative of a communication quality between the antennas and an external communication counterpart. Furthermore, at 204, a communication unit of the communication device executes said ranging sessions with the external communication counterpart with the selected specific antenna. In this way, the selection of a suitable antenna for performing the ranging sessions is facilitated. More specifically, the likelihood that the most suitable antenna is selected may be increased.

In accordance with the present disclosure, an antenna selection process may be based on distance estimate variations and channel sounding results (i.e., an estimated channel impulse response, first path power, received power, variation of distances and/or channel properties) from more than one measurement. In this way, the antenna selection process may be optimized to achieve reliable distance estimates. Thus, instead of selecting an antenna with the aim of optimizing data throughput, an antenna may be selected which results in the best estimate of the real distance between an anchor and a tag. It is noted that choosing the antenna which results in the highest received power may lead to stable communication, but also to higher distance estimation errors (e.g., in a human back body scenario with a reflective object behind the body). This may be avoided by applying the presently disclosed antenna selection process. At the same time the total number of measurements may be kept low to reduce power consumption and interference. In addition, each anchor or tag may be able to decide autonomously which antenna is the most suitable antenna. In this way, the antenna diversity of the system may become transparent to higher processing layers (e.g., a localization engine). More specifically, the presently disclosed embodiments of operating methods may be performed independently by each anchor or tag.

Figure 3:
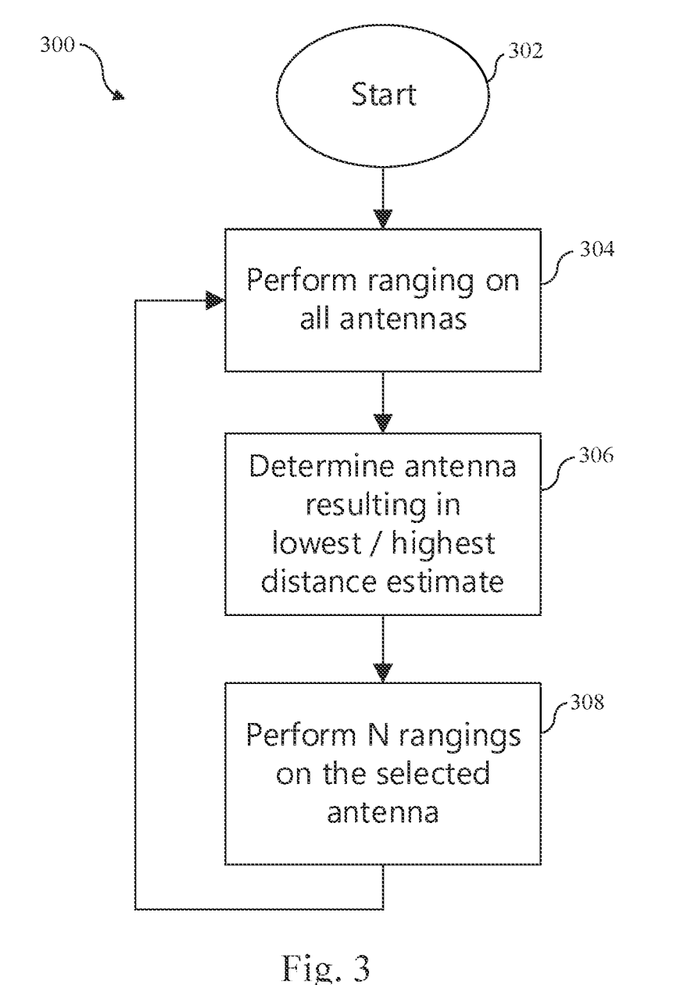
FIG. 3 shows another illustrative embodiment of a method of operating a communication device.

FIG. 3 shows another illustrative embodiment of a method 300 of operating a communication device. The method 300 comprises the following basic steps. At 302, the method starts. At 304, a ranging is performed on all antennas. Furthermore, at 306, the antenna is determined which resulted in the lowest or the highest distance estimate (i.e., the lowest or highest estimate based on at least one previous distance measurement). Finally, at 308, N rangings are performed on the selected antenna. More specifically, the method 300 may be implemented as follows:
1. Perform a single ranging on all available antennas.
2. Determine the antenna that resulted in the lowest or highest ranging estimate. Whether the lowest or highest result should be used can be provided as a parameter. The selected result is passed to the processing layer above.
3. Pass the result of the selected antenna to the processing layer above.
4. Perform N rangings on the selected antenna. N is an integer value greater or equal to zero.
5. Pass the results of the N rangings to the processing layer above.
6. Return to step 1.

It is noted that N=0 results in a special case in which block 308 is skipped and all antennas are used to perform measurements. Allowing N to be zero eliminates the need for double code with the same functionality in case the method is implemented in software.

Figure 4:
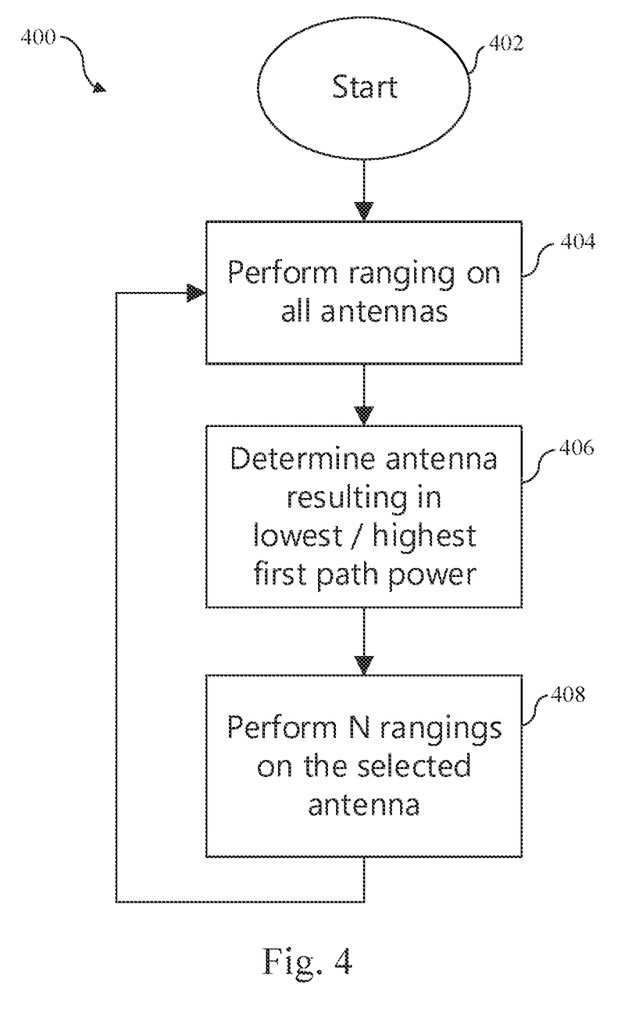
FIG. 4 shows a further illustrative embodiment of a method of operating a communication device.

FIG. 4 shows a further illustrative embodiment of a method 400 of operating a communication device. The method 400 comprises the following basic steps. At 402, the method starts. At 404, a ranging is performed on all antennas. Furthermore, at 406, the antenna is determined which resulted in the lowest or the highest first path power (i.e., the lowest or highest first path power level as determined for a previous ranging session). Finally, at 408, N rangings are performed on the selected antenna. More specifically, the method 400 may be implemented as follows:
1. Perform a single ranging on all available antennas.
2. Determine the antenna that resulted in the lowest or highest first path power. If the lowest or highest result should be used can be provided as a parameter. The selected result is passed to the processing layer above.
3. Pass the result of the selected antenna to the processing layer above.
4. Perform N rangings on the selected antenna. N is an integer value greater or equal to zero.
5. Pass the results of the N rangings to the processing layer above.
6. Return to step 1.

Figure 5:
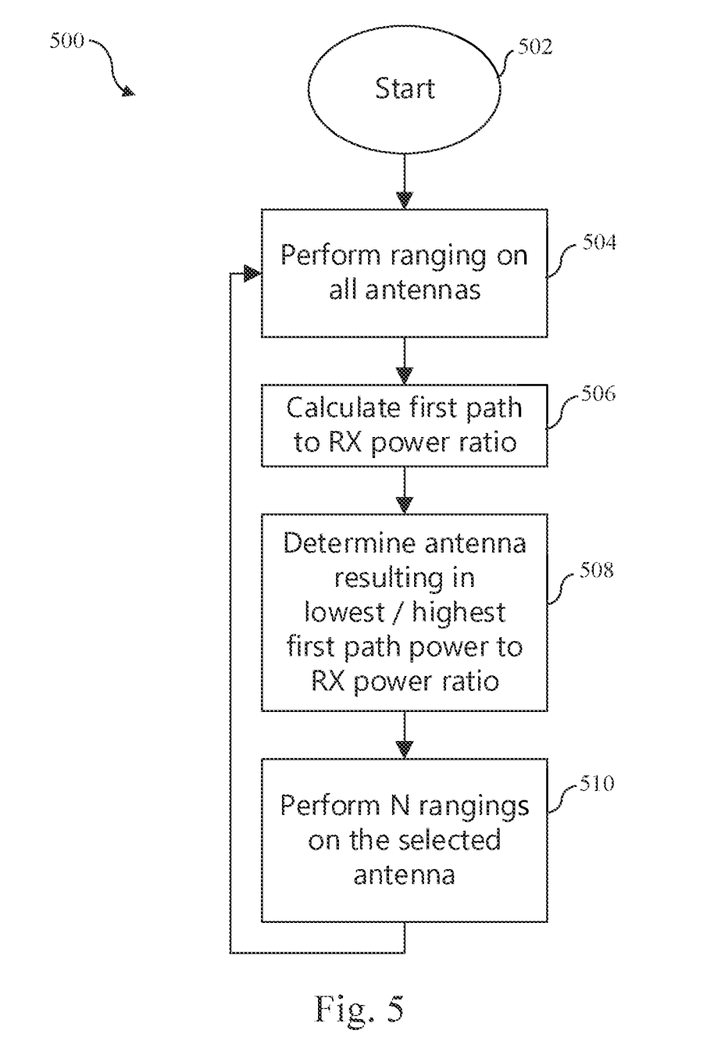
FIG. 5 shows a further illustrative embodiment of a method of operating a communication device.

FIG. 5 shows a further illustrative embodiment of a method 500 of operating a communication device. The method 500 comprises the following basic steps. At 502, the method starts. At 504, a ranging is performed on all antennas. Furthermore, at 506, the first path power to received power ratio is calculated. Furthermore, at 508, the antenna is determined which resulted in the lowest or the highest first path power to received power ratio. Finally, at 510, N rangings are performed on the selected antenna. More specifically, the method 500 may be implemented as follows:
1. Perform a single ranging on all available antennas.
2. Calculate the first path power to received power ratio for all measurements.
3. Determine the antenna that resulted in the lowest or highest first path power to received power ratio. If the lowest or highest result should be used can be provided as a parameter.
4. Pass the result of the selected antenna to the processing layer above.
5. Perform N rangings on the selected antenna. N is an integer value greater or equal to zero.
6. Pass the results of the N rangings to the processing layer above.
7. Return to step 1.

Figure 6:
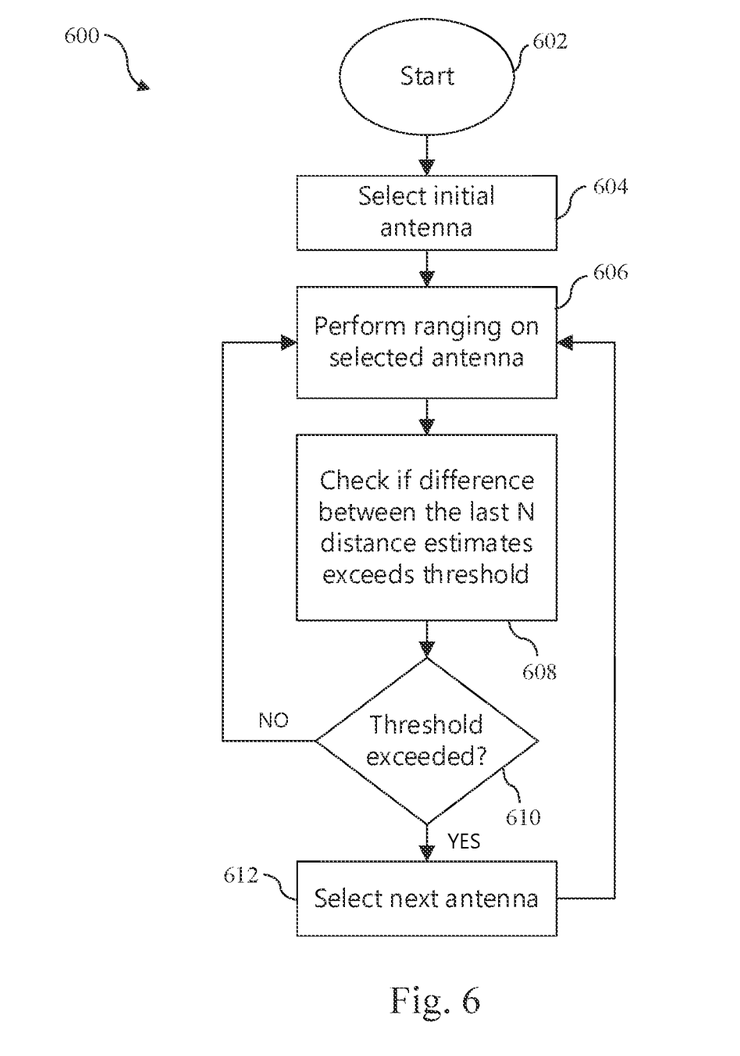
FIG. 6 shows a further illustrative embodiment of a method of operating a communication device.

FIG. 6 shows a further illustrative embodiment of a method 600 of operating a communication device. The method 600 comprises the following basic steps. At 602, the method starts. At 604, an initial antenna is selected. At 606, ranging is performed on the selected antenna. Then, at 608, it is checked if the difference between the last N distance estimates exceeds a threshold. If so, then a next antenna is selected at 612. If not, then the method 600 returns to step 606. More specifically, the method 600 may be implemented as follows:
1. Select an initial antenna, either randomly or based on prior knowledge of the antennas.
2. Perform a single ranging on the currently selected antenna and pass the result to the processing layer above.

3. Calculate the differences between consecutive distance estimates d of the last N measurements. N is an integer value greater than one. The differences Δ are calculated as follows:

$$\Delta_i = |d_i - d_i| \text{ wherein } i = \{1, \ldots, N-1\}$$

4. In step four it is checked if all of the differences ($\Delta_1, \ldots, \Delta_{N-1}$) exceed the threshold. If yes, the next antenna is selected, otherwise the same antenna is used again for the next cycle.
5. Return to step 2.

Figure 7:
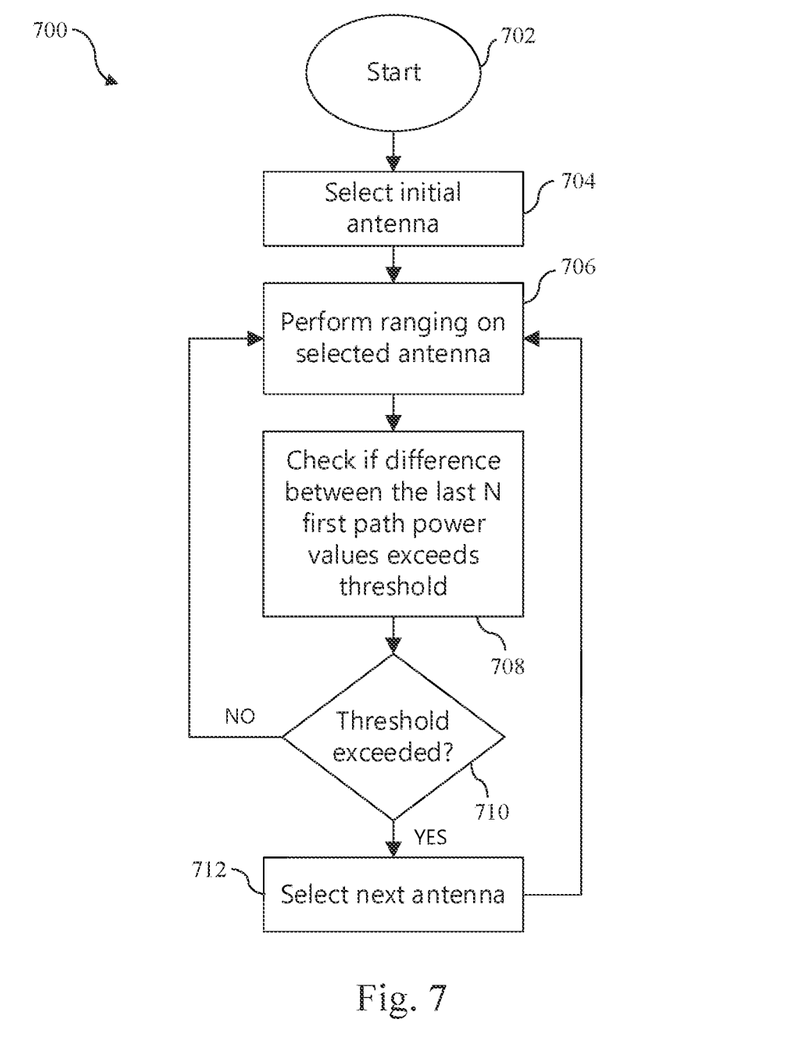
FIG. 7 shows a further illustrative embodiment of a method of operating a communication device.

FIG. 7 shows a further illustrative embodiment of a method 700 of operating a communication device. The method 700 comprises the following basic steps. At 702, the method starts. At 704, an initial antenna is selected. At 706, ranging is performed on the selected antenna. Then, at 708, it is checked if the difference between the last N first path power values exceeds a threshold. If so, then a next antenna is selected at 712. If not, then the method 700 returns to step 706. More specifically, the method 700 may be implemented as follows:

1. Select an initial antenna, either randomly or based on prior knowledge of the antennas.
2. Perform a single ranging on the currently selected antenna and pass the result to the processing layer above.
3. Calculate the differences between the first path power values P of the last N measurements. N is an integer value greater than one. The differences Δ are calculated as follows:

$$\Delta_i = |P_i - P_{i+1}| \text{ wherein } i = \{1, \ldots, N-1\}$$

4. In step four it is checked if all of the differences ($\Delta_1, \ldots, \Delta_{N-1}$) exceed the threshold. If yes, the next antenna is selected, otherwise the same antenna is used again for the next cycle.
5. Return to step 2.

Figure 8:
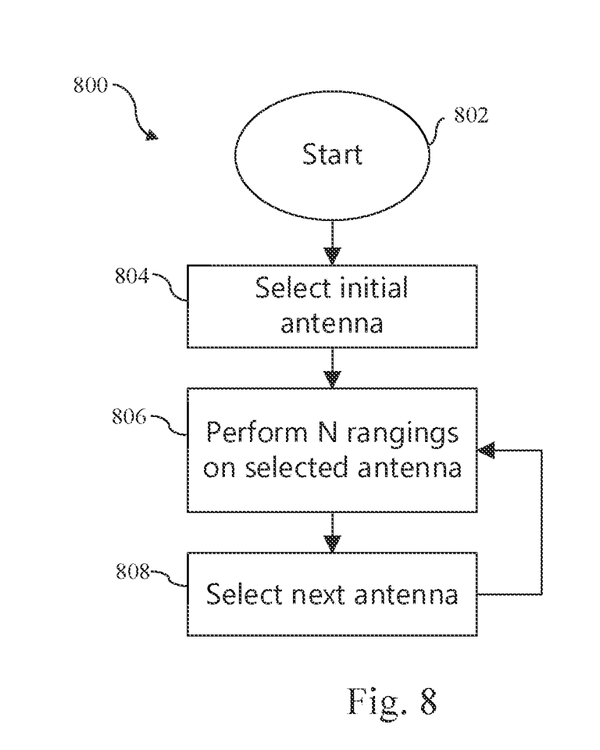
FIG. 8 shows a further illustrative embodiment of a method of operating a communication device.

FIG. 8 shows a further illustrative embodiment of a method 800 of operating a communication device. The method 800 comprises the following basic steps. At 802, the method starts. At 804, an initial antenna is selected. At 806, N rangings are performed on the selected antenna. Then, at 808, a next antenna is selected, and the method 800 returns to step 806. More specifically, the method 800 may be implemented as follows:

1. Select the initial antenna.
2. Perform N rangings on the selected antenna and pass the results to the processing layer above. N is an integer value greater than zero.
3. Select the next antenna.
4. Return to step 2.

Figure 9:
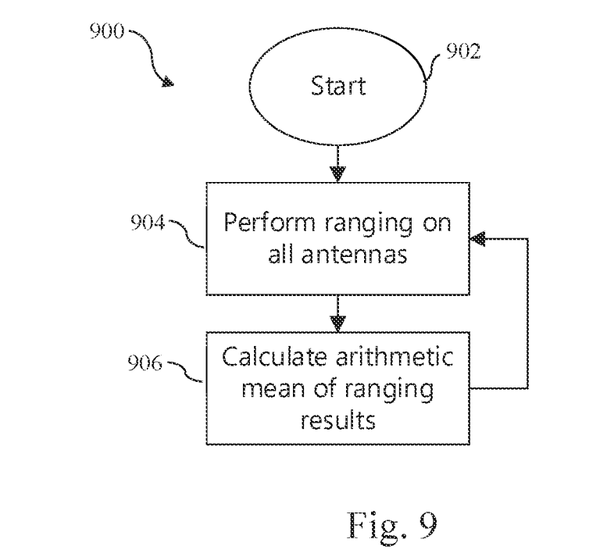
FIG. 9 shows a further illustrative embodiment of a method of operating a communication device.

FIG. 9 shows a further illustrative embodiment of a method 900 of operating a communication device. The method 900 comprises the following basic steps. At 902, the method starts. At 904, ranging is performed on all antennas. Then, at 906, the arithmetic mean of the ranging results is calculated, and the method 900 returns to step 904. More specifically, the method 900 may be implemented as follows:

1. Perform rangings on all antennas.
2. Calculate the arithmetic mean value of all ranging results. Pass the result to the processing layer above.
3. Return to step 1.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 communication device
102 antenna
104 antenna
106 antenna
108 communication unit
110 antenna selection unit
200 method of operating a communication device
202 selecting, by an antenna selection unit of a communication device, a specific antenna from a plurality of antennas for carrying out one or more ranging sessions, wherein the antenna selection unit selects said specific antenna in dependence on one or more parameters indicative of a communication quality between the antennas and an external communication counterpart
204 executing, by a communication unit of the communication device, said ranging sessions with the external communication counterpart with the selected specific antenna
300 method of operating a communication device
302 start
304 perform ranging on all antennas
306 determine antenna resulting in lowest/highest distance estimate
308 perform N rangings on the selected antenna
400 method of operating a communication device
402 start
404 perform ranging on all antennas
406 determine antenna resulting in lowest/highest first path power
408 perform N rangings on the selected antenna
500 method of operating a communication device
502 start
504 perform ranging on all antennas
506 calculate first path to RX power ratio
508 determine antenna resulting in lowest/highest first path power to RX power ratio
510 perform N rangings on the selected antenna
600 method of operating a communication device
602 start
604 select initial antenna
606 perform ranging on selected antenna
608 check if difference between the last N distance estimates exceeds threshold
610 threshold exceeded?
612 select next antenna
700 method of operating a communication device
702 start
704 select initial antenna
706 perform ranging on selected antenna
708 check if difference between the last N first path power values exceeds threshold
710 threshold exceeded?
712 select next antenna
800 method of operating a communication device
802 start
804 select initial antenna
806 perform N rangings on selected antenna
808 select next antenna
900 method of operating a communication device
902 start
904 perform ranging on all antennas
906 calculate arithmetic mean of ranging results

The invention claimed is:

1. A communication device, comprising:
a plurality of antennas;
a communication unit configured to execute ranging sessions with an external communication counterpart through said antennas;
an antenna selection unit configured to select a specific antenna from said plurality antennas for carrying out one or more of said ranging sessions, wherein the antenna selection unit is configured to select said specific antenna in dependence on one or more parameters indicative of a communication quality between the antennas and the external communication counterpart;
wherein the antenna selection unit is further configured to switch to a next antenna of said plurality of antennas if a difference between two or more consecutive distance measurements performed on a current antenna exceeds a predefined first threshold.

2. The communication device of claim 1, wherein said parameters include a previously measured distance between the communication device and the external communication counterpart.

3. The communication device of claim 2, wherein said parameters include a first path power level.

4. The communication device of claim 2, wherein the antenna selection unit is further configured to switch to a next antenna of said plurality of antennas if a difference between first path power levels associated with two or more consecutive distance measurements exceeds a predefined second threshold.

5. The communication device of claim 1, wherein said parameters include a first path power level.

6. The communication device of claim 5, wherein the antenna selection unit is configured to select the specific antenna that resulted in a lowest first path power level among the plurality of antennas or the specific antenna that resulted in a highest first path power level among the plurality of antennas.

7. The communication device of claim 1, wherein the antenna selection unit is further configured to switch to a next antenna of said plurality of antennas if a difference between first path power levels associated with two or more consecutive distance measurements exceeds a predefined second threshold.

8. The communication device of claim 1, wherein the antenna selection unit is a reconfigurable antenna selection unit.

9. The communication device of claim 1, wherein the communication unit is an ultra-wideband, UWB, communication unit.

10. The communication device of claim 2, A communication device, comprising:
a plurality of antennas;
a communication unit configured to execute ranging sessions with an external communication counterpart through said antennas;
an antenna selection unit configured to select a specific antenna from said plurality antennas for carrying out one or more of said ranging sessions, wherein the antenna selection unit is configured to select said specific antenna in dependence on one or more parameters indicative of a communication quality between the antennas and the external communication counterpart;
wherein said parameters include a previously measured distance between the communication device and the external communication counterpart;
wherein the antenna selection unit is configured to select the specific antenna that resulted in a smallest previously measured distance among the plurality of antennas or the specific antenna that resulted in a largest previously measured distance among the plurality of antennas.

11. The communication device of claim 10, wherein the antenna selection unit is further configured to switch to a next antenna of said plurality of antennas if a difference between two or more consecutive distance measurements performed on a current antenna exceeds a predefined first threshold.

12. A communication device, comprising:
a plurality of antennas;
a communication unit configured to execute ranging sessions with an external communication counterpart through said antennas;
an antenna selection unit configured to select a specific antenna from said plurality antennas for carrying out one or more of said ranging sessions, wherein the antenna selection unit is configured to select said specific antenna in dependence on one or more parameters indicative of a communication quality between the antennas and the external communication counterpart;
wherein said parameters include a ratio between a first path power level and a received power level.

13. The communication device of claim 12, wherein the antenna selection unit is configured to select the specific antenna that resulted in a lowest ratio between the first path power level and the received power level among the plurality of antennas or to select the specific antenna that resulted in a highest ratio between the first path power level and the received power level among the plurality of antennas.

14. The communication device of claim 12, wherein the antenna selection unit is further configured to switch to a next antenna of said plurality of antennas if a difference between two or more consecutive distance measurements performed on a current antenna exceeds a predefined first threshold.

15. The communication device of claim 12, wherein said parameters include a previously measured distance between the communication device and the external communication counterpart.

16. A communication device, comprising:
a plurality of antennas;
a communication unit configured to execute ranging sessions with an external communication counterpart through said antennas;
an antenna selection unit configured to select a specific antenna from said plurality antennas for carrying out one or more of said ranging sessions, wherein the antenna selection unit is configured to select said specific antenna in dependence on one or more parameters indicative of a communication quality between the antennas and the external communication counterpart;
wherein the antenna selection unit is further configured to switch to a next antenna of said plurality of antennas after a predefined number of ranging sessions has been performed on a current antenna.

17. The communication device of claim 16, wherein said parameters include a previously measured distance between the communication device and the external communication counterpart.

18. A communication device, comprising:
a plurality of antennas;
a communication unit configured to execute ranging sessions with an external communication counterpart through said antennas;
an antenna selection unit configured to select a specific antenna from said plurality antennas for carrying out one or more of said ranging sessions, wherein the antenna selection unit is configured to select said specific antenna in dependence on one or more parameters indicative of a communication quality between the antennas and the external communication counterpart;
a processing unit configured to calculate an arithmetic mean value of the results of ranging sessions performed on different antennas of said plurality of antennas.

19. The communication device of claim 18, wherein said parameters include a previously measured distance between the communication device and the external communication counterpart.

20. The communication device of claim 18, wherein the antenna selection unit is further configured to switch to a next antenna of said plurality of antennas if a difference between two or more consecutive distance measurements performed on a current antenna exceeds a predefined first threshold.

21. A method of operating a communication device, the device comprising a plurality of antennas, a communication unit and an antenna selection unit, the method comprising:
selecting, by the antenna selection unit, a specific antenna from said plurality antennas for carrying out one or more ranging sessions, wherein the antenna selection unit selects said specific antenna in dependence on one or more parameters indicative of a communication quality between the antennas and an external communication counterpart;
executing, by the communication unit, said ranging sessions with the external communication counterpart with the selected specific antenna;

wherein the antenna selection unit switches to a next antenna of said plurality of antennas if a difference between two or more consecutive distance measurements performed on a current antenna exceeds a predefined first threshold.

* * * * *